United States Patent [19]

Hoebeke et al.

[11] Patent Number: 5,525,370

[45] Date of Patent: Jun. 11, 1996

[54] PROCESS FOR THE PREPARATION OF MATTE COATINGS USING POWDERED THERMOSETTING COMPOSITIONS

[75] Inventors: Jean-Marie Hoebeke, Charleroi; Daniel Maetens, Brussels; Michel Baudour, Angreau; Jean-Marie Loutz, Brussels, all of Belgium

[73] Assignee: U C B S.A., Brussels, Belgium

[21] Appl. No.: 372,374

[22] Filed: Jan. 13, 1995

Related U.S. Application Data

[62] Division of Ser. No. 361,473, Dec. 22, 1994, Pat. No. 5,436,311, which is a continuation of Ser. No. 1,550, Jan. 6, 1993, abandoned.

[30] Foreign Application Priority Data

Jan. 8, 1992 [GB] United Kingdom .................... 9200330

[51] Int. Cl.$^6$ ..................................................... B05D 3/02
[52] U.S. Cl. ........................ 427/195; 427/485; 427/486
[58] Field of Search .................................. 427/195, 485, 427/486; 525/173, 174, 176, 934; 428/413, 480, 482

[56] References Cited

U.S. PATENT DOCUMENTS

| | | | |
|---|---|---|---|
| 3,781,380 | 12/1973 | Labana et al. | 525/208 |
| 3,880,946 | 4/1975 | Labana et al. | |
| 3,989,767 | 11/1976 | Homma et al. | 525/30 |
| 4,027,066 | 5/1977 | Victorius | 525/161 |
| 4,066,613 | 1/1978 | Peng | 524/904 |
| 4,089,910 | 5/1978 | Shibata et al. | 427/195 |
| 4,091,049 | 5/1978 | Labana et al. | 525/327.3 |
| 4,137,277 | 1/1979 | Nordstrom et al. | 525/117 |
| 4,211,691 | 7/1980 | Fitzgerald et al. | 525/208 |
| 4,388,448 | 6/1983 | Melby | 525/327.3 |
| 4,499,239 | 2/1985 | Murakami et al. | 525/111 |
| 5,006,612 | 4/1991 | Danick et al. | 525/438 |
| 5,212,243 | 5/1993 | Toyoda et al. | 525/187 |

FOREIGN PATENT DOCUMENTS

| | | |
|---|---|---|
| 676743 | 8/1966 | Belgium . |
| 0038635 | 10/1981 | European Pat. Off. . |

OTHER PUBLICATIONS

Kansai Paint, Central Patents Index, Basic Abstracts Journal, Week 7917 AN70-32542B JP-A-54036339 (Mar. 17, 1979).

*Primary Examiner*—Shrive Beck
*Assistant Examiner*—Erma Cameron
*Attorney, Agent, or Firm*—Wenderoth, Lind & Ponack

[57] ABSTRACT

A process for the preparation of a matte coating on an article is described, which comprises applying to said article a powdered thermosetting composition comprising as binder a mixture of a linear carboxyl group-containing polyester and a glycidyl group-containing acrylic copolymer and curing the thus coated article at a temperature of from 160° C. to 210° C. for a period of up to about 30 minutes. The polyester has an acid number of 20 to 50 mg KOH/g, and is the esterification product of a hydroxyl group-containing polyester with an organic dicarboxylic acid. The acrylic copolymer is obtained from 5% to 30% by weight of glycidyl acrylate or glycidyl methacrylate and 70% to 95% by weight of methyl methacrylate, whereby up to 25% of the total weight of methyl methacrylate can be replaced by another vinyl monomer, said acrylic copolymer having a number-average molecular weight (Mn) of from about 4,000 to about 10,000.

9 Claims, No Drawings

PROCESS FOR THE PREPARATION OF MATTE COATINGS USING POWDERED THERMOSETTING COMPOSITIONS

This application is a division of application Ser. No. 08/361,473, filed Dec. 22, 1994, (now U.S. Pat. No. 5,436,311), which application is a continuation of now abandoned application Ser. No. 08/001,550, filed Jan. 6, 1993.

The present invention relates to powdered thermosetting compositions comprising as binder a mixture of a carboxyl group-containing polyester and a glycidyl group-containing acrylic copolymer and more particularly, to powdered thermosetting compositions which produce matte coatings on curing. The invention also relates to the use of said compositions for the preparation of powdered paints and varnishes which give matte coatings, and also to the matte coatings obtained by the use of these compositions.

At the present time, powdered thermosetting compositions are widely used as paints and varnishes for coating the most various articles. The advantages of these powders are numerous; on the one hand the problems associated with solvents are completely eliminated and on the other hand the powders are not wasted, since only the powder in direct contact with the article is retained on the article, any excess powder being, in principle, entirely recoverable and reusable. For these and other reasons, powdered coating compositions are preferred to coating compositions in the form of solutions in organic solvents.

Powdered thermosetting compositions have already been widely used in the manufacture of domestic electrical appliances, garden furniture, bicycles, accessories for the automobile industry, and the like. They generally contain an organic thermosetting binder, fillers, pigments, catalysts and various additives to adapt their properties to their intended use.

There are two main types of powdered thermosetting compositions; the first includes those which contain as binder a mixture of carboxyl group-containing polymers such as a carboxyl group-containing polyester or polyacrylate, and epoxy compounds, mainly triglycidyl isocyanurate, and the second includes those which contain as binder a mixture of hydroxyl group-containing polymers usually a hydroxyl group-containing polyester, with isocyanates blocked with phenol, caprolactam and the like.

These thermosetting powders are generally prepared in the following manner. The polymer and a cross-linking agent, any catalyst, pigments, fillers and other additives (if they are used) are dry-blended. The resulting mixture is passed into an extruder in order to effect homogenization in the molten phase between 80° and 120° C. The mixture leaving the extruder is cooled and ground into a powder having the desired particle size of between 30 and 120 micrometers. The powder thus obtained is then applied in a manner which is known per se, by means of an electrostatic spray gun, on the metal object to be coated, under a potential difference of on average 50 kV. The coated object is then heated in an oven, where cross-linking of the binder is achieved.

Powdered coating compositions in general give coatings which have a good adhesion to metal substrates (steel or aluminum) and an excellent weatherability. However, the majority of these compositions provide coatings having a high gloss after fusion and curing. The gloss measured at an angle of 60°, in accordance with ASTM D523, is in fact very often equal to or indeed even greater than 90%. For example, a composition of this kind is described in European Patent No. 38635. The composition contains 60 to 97% by weight of a linear polyester resin having an acid number of 15 to 200 mg KOH/g and 3 to 40% by weight of a glycidyl group-containing acrylic polymer having a number-average molecular weight ($\overline{Mn}$) of 300 to 5,000, preferably of 500 to 3,000. However, this patent does not disclose the possibility to obtain matte coatings.

There is an increasing demand for powdered paints and varnishes which provide matte coatings of good quality, for example for coating certain accessories in the automobile industry, such as wheel rims, bumpers and the like, or for coating metal panels and beams used in construction.

Thus, various methods for manufacturing powdered paints and varnishes, that provide matte coatings, have been proposed. However, experience has shown that it is difficult, using conventional conditions of extrusion and curing to produce a powdered paint capable of providing a matte finish, in a manner which is entirely reliable and reproducible. According to one of these methods, one or more particular matting agent(s), such as silica, talcum, chalk or metal salts, is introduced into the powdered composition, in addition to the binder and conventional pigments. However, the reduction in gloss is often insufficient and a marked change in the properties of the resulting coatings, such as, for example, a reduced adhesion to metal substrates is observed. To cope with these disadvantages it has been proposed, in European Patent No. 165,207, to incorporate waxes, for example a polyolefin wax, and metal salts (for example zinc 2-benzothiazolethiolate) into powdered compositions based on carboxyl group-terminated polyesters and epoxy compounds, such as triglycidyl isocyanurate. In the same way, in U.S. Pat. No. 4,242,253, the use of calcium carbonate and finely divided polypropylene particles as additives are proposed, to provide coatings with low gloss characteristics. A disadvantage of this system is that the inorganic fillers, which are often incorporated in significant amounts, can damage the extruders and impair the required appearance of the surface of the coating obtained, which often shows a rough and irregular appearance. In addition, the added waxes migrate readily to the surface of the formed coating, causing unacceptable variations in the degree of matteness of the coating as it ages. Furthermore, the need to add additional fillers results in an additional expense, which in itself constitutes a disadvantage.

According to U.S. Pat. No. 3,842,035, a matte finish can be achieved by using a coating composition obtained by dry-blending two powdered thermosetting compositions after they have been extruded separately. One composition is a slow-curing composition (long gel time) and the other is a fast-curing composition (short gel time). By using this system, it is possible to obtain after curing a matte coating, without using a particular matteing agent. The main disadvantage of this system is the need to dry blend large amounts of formulated powders, which is not an easy task, especially on an industrial scale. Moreover, as this mixture cannot be made continuously but only in batches of powder, it is not easy to obtain the same degree of matteness in the coatings from one batch of powder to another. Finally, powder which is recovered after spraying and reused as a paint may not have the same composition as it did when first sprayed, which gives rise to a further change in the degree of matteness observed.

There are other systems intended to make matte coatings wherein two polymers of different types or reactivity are used, together with one or more cross-linking agents, so that two distinct cross-linking mechanisms or two very different rates of reaction are induced. In these systems, the preparation of the powder is carried out in a single step, in contrast to the process described in U.S. Pat. 3,842,035. It is thus possible to produce by a single extrusion a powdered paint capable of forming coatings of very low gloss.

By way of example, Japanese Patent Application No. 154,771/88 describes a resin composition for a matte powder paint comprising a mixture of a branched hydroxyl group-containing polyester having a high hydroxyl number with another hydroxyl group-containing polyester having a lower hydroxyl number, in the proportions specified, and a blocked isocyanate as the cross-linking agent. After cross-linking, this composition produces a matte coating having good mechanical properties and a good weatherability. European Patent Application No. 366,608 describes powdered paints obtained by a single extrusion and which produce matte coatings, but these include two cross-linking agents. These powdered paints contain an epoxy resin, in particular bisphenol A diglycidyl ether, a polycarboxylic acid, such as for example 2,2,5,5-tetra(β-carboxyethyl)cyclopentanone, as the first cross-linking agent, and a saturated carboxyl group-terminated polyester, tolylbiguanide or dicyandiamide as the second cross-linking agent.

Finally, compounds which are active in two different reaction systems to form matte coatings, are described for example, in European Patent No. 104,424. In this patent the preparation of a powder using only a single extrusion is proposed. This powder contains both a hydroxyl group-containing resin, such as a hydroxyl group-containing polyester and a polyepoxy compound, such as triglycidyl isocyanurate, as the binder, and it includes a particular cross-linking agent which contains in its molecule both carboxyl groups (to react with the epoxy compound) and blocked isocyanate groups (to react with the hydroxyl group-containing resin).

The main disadvantage of the powdered paints obtained by a single extrusion described in the above-mentioned patents, is that the properties of any powdered paint produced thereby are highly sensitive to changes in the extrusion conditions, such as temperature, shear rate etc., and, since accurate control of these conditions is difficult, it is not easy to consistently reproduce coatings having the same degree of matteness from a well-defined composition. Particularly, it is difficult to find a composition which produces a matte coating in an entirely reliable and reproducible manner using conventional extrusion conditions.

In conclusion, it can be seen that the various powdered thermosetting compositions that form matte coatings, which have been proposed to date, all have a number of disadvantages.

There is, thus, still a need for powdered thermosetting compositions capable of producing matte coatings which do not exhibit the defects of the compositions of the prior art.

According to the present invention, we have, surprisingly, found that by using as binder a mixture of a linear carboxyl group-containing polyester having a relatively low acid number with a glycidyl group-containing acrylic copolymer having a specified composition and having a molecular weight within a well-defined range, it is possible to obtain powdered thermosetting compositions which consistently produce matte coatings, having substantially the same degree of matteness, with good mechanical properties and an excellent weatherability, and without requiring the addition of particular additives as matting agents.

Thus, according to the present invention, there is provided a powdered thermosetting composition comprising as binder a mixture of a) a linear carboxyl group-containing polyester having an acid number of 20 to 50 mg KOH/g, and b) a glycidyl group-containing acrylic copolymer obtained from 5% to 30% by weight of glycidyl acrylate or glycidyl methacrylate and from 70% to 95% by weight of methyl methacrylate, whereby up to 25% by weight of the methyl methacrylate can be replaced by another vinyl monomer, said acrylic copolymer having a number-average molecular weight ($\overline{M}n$) of from about 4,000 to about 10,000.

The term "matte" used in the present specification indicates that the cured coatings have a gloss of less than or equal to 15%, measured at an angle of 60° according to ASTM D523.

The linear carboxyl group-containing polyesters which can be used in the compositions according to the present invention are well-known in the prior art and are currently used in formulations for powdered paints and varnishes for providing coatings intended for exterior use.

According to the invention, the polyester used should be a linear polyester having an acid number of 20 to 50 mg KOH/g; its functionality, thus, will be equal to 2 (the functionality represents the average number of carboxyl groups per unit of molecular weight). Preferably its number-average molecular weight is between 2,200 and 6,000. It is important to respect the values of these parameters to obtain matte coatings having good mechanical and chemical properties and good weathering resistance. In fact, if the polyester is a branched polyester (functionality greater than 2) or if the acid number of the polyester is 70 mg KOH/g, the coating obtained is not matte but glossy (Example 6). The glass transition temperature (Tg) of the polyester is preferably between 50° and 80° C., so that it remains solid at a normal storage temperature (20° to 50° C.), to prevent reagglomeration of the powdered thermosetting compositions during handling, transport and storage.

The acid constituent of the linear carboxyl group-containing polyester is an organic dicarboxylic acid, which can be an aromatic dicarboxylic acid, such as terephthalic acid, isophthalic acid, phthalic acid, and the like, or an aliphatic or cycloaliphatic dicarboxylic acid, such as adipic acid, succinic acid, 1,4-cyclohexanedicarboxylic acid, and the like, alone or in admixture. These acids can be used in the form of the free acid or, if appropriate, in the form of the anhydride, or also in the form of an ester with a lower aliphatic alcohol.

The alcoholic constituent of the linear carboxyl group-containing polyester is an organic dihydroxy compound, which is preferably selected from the aliphatic diols, such as neopentyl glycol, ethylene glycol, diethylene glycol, 1,4-butanediol, 1,6-hexanediol, neopentyl glycol hydroxypivalate, 1,4-cyclohexanedimethanol, 2,2-bis(4-hydroxycyclohexyl)propane and the like, alone or in admixture. Polyesters consisting mainly of terephthalic acid, isophthalic acid and neopentyl glycol are preferably used, but polyesters in which all the constituents are aliphatic compounds can also be used.

The carboxyl group-containing polyester is prepared by conventional methods for syhthesizing polyesters by direct esterification or by transesterification, in one or more steps. In the latter case, a hydroxyl group-containing polyester is first prepared from one or more organic dicarboxylic acids (or their functional derivatives) and an excess of an organic dihydroxy compound, and the hydroxyl group-containing polyester thus obtained is then esterified with an organic dicarboxylic acid to give a linear carboxyl group-containing polyester.

The polyester synthesis is generally carried out in a reactor equipped with a stirrer, an inert gas (nitrogen, for example) inlet and outlet, a thermocouple, an adiabatic column, a condenser, a water separator and a vacuum connection tube.

The esterification conditions are the classical conditions, that is to say a conventional esterification catalyst, such as dibutyltin oxide or n-butyltin trioctanoate, can be used in an amount of 0.01 to 0.5% by weight of the reagents, and optionally an antioxidant, for example tributyl phosphite, can be added in an amount of 0.01 to 0.5% by weight of the reagents.

The polyesterification is generally carried out at a temperature which is gradually increased from 130° C. to about 200° to 240° C., first under normal pressure and then under reduced pressure, this temperature being maintained until a polyester which has the desired hydroxyl and/or acid number is obtained. In a two-step process, the reaction mixture containing the hydroxyl group-containing polyester obtained in the first step is allowed to cool to 200° C., the desired amount of dicarboxylic acid is added, the temperature is brought to 225° C. and this temperature is maintained, first under normal pressure and then under reduced pressure until a carboxyl group-containing polyester having the desired acid number is obtained, which can vary between 20 and 50 mg KOH/g polyester. The degree of esterification is monitored by determining the amount of water formed in the course of the reaction and the properties of the polyester obtained, for example the acid number, the molecular weight or the viscosity. At the end of the synthesis, the polyester is cast into a thick layer, allowed to cool and ground into particles having an average size of from a fraction of a mm to a few mm.

The glycidyl group-containing acrylic copolymers suitable for use in the powdered thermosetting compositions of the present invention are obtained from 5 to 30% by weight of glycidyl acrylate or glycidyl methacrylate and 70 to 95% by weight of methyl methacrylate. Optionally, up to 25% by weight of the methyl methacrylate can be replaced by another vinyl monomer.

According to the invention, the glycidyl group-containing acrylic copolymer should have a number-average molecular weight ($\overline{M}n$) of between about 4,000 and about 10,000, and preferably a number-average molecular weight within the range of from more than 5,000 to 9,000. For better control of this molecular weight and its distribution, the monomers are polymerized in the presence of a free radical polymerization initiator and a chain transfer agent. The polydispersity of these copolymers $\overline{M}w/\overline{M}n$ is preferably between 1.5 and 2.5 ($\overline{M}n$ being the number-average molecular weight and $\overline{M}w$ being the weight-average molecular weight).

It is essential that an acrylic copolymer containing glycidyl groups is used in the composition according to the invention. In fact, it has been discovered, surprisingly, that this copolymer plays an essential role in obtaining matte coatings having good properties of appearance, adhesion to metal substrates and weathering resistance. It has been found, in fact, that only compositions containing acrylic copolymers of which the number-average molecular weight $\overline{M}n$ is within the range from 4,000 to 10,000 give coatings having both a matte and regular appearance and good adhesion to a metal substrate. If the molecular weight of the acrylic copolymer is less than 4,000 the coating obtained is not matte but glossy. If the molecular weight of the acrylic copolymer is greater than 10,000 the coating obtained is matte but does not adhere sufficiently to a metal substrate and has defects on its surface (poor appearance; see Example 4).

The monomer composition of the acrylic copolymer is also very critical for obtaining matte coatings. If its content of glycidyl acrylate or glycidyl methacrylate exceeds 30% by weight, the coating obtained is not matte but glossy. On the other hand, it is absolutely necessary for the acrylic polymer to contain a preponderant amount of methyl methacrylate besides the glycidyl acrylate or methacrylate. In fact, if more than 25% by weight of the methyl methacrylate is replaced by (an)other vinyl monomer(s), a coating which is clearly more glossy is obtained (Example 5).

Examples of the vinyl monomer which can be used as a comonomer to replace the methyl methacrylate in the acrylic copolymer include alkyl acrylates and methacrylates, such as methyl acrylate, ethyl acrylate, butyl acrylate, 2-ethylhexyl acrylate, ethyl methacrylate, butyl methacrylate, styrene, and the like, alone or in admixture.

The acrylic copolymer containing glycidyl groups has a functionality of preferably between 2 and 12 (the functionality represents the average number of epoxy groups per unit of molecular weight).

The content of epoxy groups in the acrylic polymer is preferably between 0.3 and 2.2 milliequivalents of epoxy/g polymer.

The glass transition temperature (Tg) of the acrylic copolymer is preferably between 40° and 70° C., and its viscosity determined by the ICI method at 200° C. (see examples) is between 8,000 and 40,000 mPa.s.

The glycidyl group-containing acrylic copolymer is prepared by conventional polymerization techniques, either in mass, in emulsion, or in solution in an organic solvent. The nature of the solvent is very little of importance, provided that it is inert and that it readily dissolves the monomers and the synthesized copolymer. Suitable solvents include toluene, ethyl acetate, xylene etc. The monomers are copolymerized in the presence of a free radical polymerization initiator (benzoyl peroxide, dibutyl peroxide, azo-bis-isobutyronitrile, and the like) in an amount representing 0.1 to 1% by weight of the monomers.

To achieve a good control of the molecular weight and its distribution, a chain transfer agent, preferably of the mercaptan type, such as n-dodecylmercaptan, t-dodecanethiol, isooctylmercaptan, or of the carbon halide type, such as carbon tetrabromide, bromotrichloromethane etc., is also added in the course of the reaction. The chain transfer agent is used in an amount of from 1.5 to 4%, preferably between 2 and 3.5% by weight of the monomers used in the copolymerization.

A cylindrical, double-walled reactor equipped with a stirrer, a condenser, an inert gas (nitrogen, for example) inlet and outlet and a metering pump feed system is generally used to prepare the glycidyl group-containing acrylic copolymer.

Polymerization is carried out under conventional conditions. Thus, when polymerization is carried out in solution, for example, an organic solvent is introduced into the reactor and heated to reflux temperature under an inert gas atmosphere (nitrogen, carbon dioxide, and the like), and a homogeneous mixture of the required monomers, free radical polymerization initiator and chain transfer agent is then added to the solvent gradually over several hours. The reaction mixture is then maintained at reflux temperature for some hours, while stirring, and the major portion of the solvent is then distilled off. The copolymer obtained is subsequently freed from the remainder of the solvent in vacuo. The acrylic copolymer obtained is in the form of a solid product, which is easily ground to give a whitish powder.

The linear carboxyl group-containing polyester and the glycidyl group-containing acrylic copolymer described above together constitute the basic binder for the powdered thermosetting compositions according to the present invention.

The present invention also relates to the use of the powdered thermosetting compositions according to the invention for the preparation of powdered varnishes and paints which produce matte coatings, as well as to powdered varnishes and paints obtained by means of these compositions.

The ratio of the amount of linear carboxyl group-containing polyester to the amount of glycidyl group-containing acrylic copolymer in the powdered thermosetting compositions of the present invention is such that there are 0.5 to 1.5, and preferably 0.8 to 1.2 equivalents of carboxyl groups per equivalent of epoxy groups in the acrylic copolymer.

The powdered thermosetting compositions of the present invention can be prepared by homogeneously mixing the linear carboxyl group-containing polyester and the glycidyl group-containing acrylic copolymer with various auxiliary substances conventionally used for preparing powdered paints and varnishes.

This homogenization is carried out, for example, by melting the polyester, the acrylic copolymer and the various auxiliary substances at a temperature of 90° to 110° C., preferably in an extruder, for example a Buss Ko-Kneter extruder or a twin-screw extruder of the Werner-Pfleiderer or Baker Perkins type. The extrudate is then allowed to cool, and is ground and sieved to give a powder, the particle size of which is between 20 and 100, preferably between 30 and 40 micrometers.

The auxiliary substances which can be added to the powdered thermosetting compositions are, for example, pigments, such as titanium dioxide or iron oxides, organic dyestuffs or the like, fillers, such as barium sulfate or calcium sulfate or carbonate, flow control agents, such as RESIFLOW® PV5 (from WORLEE) or MODAFLOW® (from MONSANTO) or ACRONAL® 4F (from BASF), plasticizers, such as dicyclohexyl phthalate or triphenyl phosphate, and grinding aids. These auxiliary substances are used in the usual amounts, it being understood that if the thermosetting compositions according to the invention are used as varnishes, auxiliary substances having opacifying properties will be omitted. Cross-linking catalysts which are known per se, of the amine, phosphine or ammonium or phosphonium salt type, can also be added. However, these catalysts are only useful with compositions, which cross-link very slowly. Also the use of a catalyst is not recommended with compositions which can rapidly cross-link, because it can cause a loss of matteness in the resulting coating. A few preliminary tests will easily determine whether the presence of a catalyst is desirable.

A further object of the present invention also relates to the use of the powdered thermosetting compositions of the present invention for obtaining matte coatings, especially on the surface of metal objects, particularly those formed from steel or aluminum.

Thermosetting compositions of the present invention are suitable for application by conventional techniques; they may be applied with a spray gun in an electrostatic field or with a triboelectric gun in which the powder is charged by friction, or also by the well-known fluidized bed coating technique.

After having been applied to the article in question, the coatings deposited are cured by heating in an oven at a temperature of from 160° to 210° C., for a period of up to 30 minutes, in order to obtain complete cross-linking of the coating.

As shown in more detail in the examples which follow, the powdered thermosetting compositions of the present invention can provide coatings having a very low gloss. In fact, this gloss, measured at an angle of 60° according to ASTM D523, is always less than 15%.

Moreover, the present invention results in matte coatings which have a combination of other favorable properties, which include, inter alia, a smooth and regular surface without apparent defects, a good adhesion on metal surfaces, as well as an outstanding weatherability and resistance to UV rays. The achievement of a matte finish is thus not accompanied by an impairment of the other properties of the coatings, as is the case with the compositions of the prior art, in which one or more particular matting agents (silica, waxes, and the like) are incorporated to obtain matte coatings.

Compositions according to the invention also have the advantage of not containing toxic components, such as triglycidyl isocyanurate, as is the case for a large number of powdered thermosetting compositions of the prior art.

Furthermore, the working conditions required to produce and use powdered paints according to the invention, such as, for example, the extrusion conditions and the curing temperatures for the coatings, are not at all critical. A matte finish can thus be obtained in an entirely certain and reproducible manner by using the compositions according to the present invention. Finally, from an economic point of view, the powdered compositions according to the invention are less expensive and easier to use because the basic binder contains only two constituents, a linear carboxyl groups containing polyester and a glycidyl group-containing acrylic copolymer, while powdered thermosetting compositions of the prior art often contain at least a third constituent, required to bring about the matting effect.

The examples which follow illustrate the invention without limiting it. In these examples, the determination of certain characteristic values was carried out in accordance with the methods described below:

Gloss: This is expressed by the intensity of reflected light, in per cent, with respect to the intensity of the incident light at an angle of 60° and measured according to ASTM D523;

Appearance of the coatings: This appearance is evaluated by visual examination of the coatings deposited; two ratings are assigned, one good ("G") if the coating is regular, uniform and without apparent defects, the other poor ("P") if the coating is irregular and has defects on the surface, such as craters, grains, pinholes and the like;

Q-U-V® test: Aluminum panels coated with the powdered paint to be tested are placed in a "Q-U-V Panel" apparatus obtained from the Q-Panel Co. (Cleveland—United States) and are subjected to several cycles of exposure to UV lamps and humidity at various temperatures. Amongst the various cycles of this type described in ASTM G 5388, in the present case, the coatings were subjected to a cycle of 8 hours of exposure to a UVB 313 lamp at 60° C. and 4 hours of condensation of water vapor, with the lamp switched off, at 40° C.; since the change in gloss is not very significant for matte coatings, the change in the appearance of the coatings, their adhesion to the metal and their change in tint delta E after exposure to this test cycle for 1,000 hours was determined. The change in tint delta E was determined in the CIELAB system by means of a spectrophotometer of the COLORQUEST® CT 1100 type, available from Hunter Associates Lab. (USA);

Adhesion: (measured according to ASTM D 3002) a grid of 100 small squares of 1 mm² area is cut in the coating, and the cut area is covered with an adhesive paper which is then pulled off; the rating given is the number of squares out of every 10 which remain in place, that is to say the number of small squares which have not been pulled off during the test is counted;

The acid number (AN) was measured according to DIN 53402 by titration with a 0.1N methanolic solution of KOH;

The functionality represents the number of functional groups (for example carboxyl groups of the linear polyester or epoxy groups of the acrylic copolymer) present, on average, per unit of number-average molecular weight $\overline{Mn}$;

The number-average molecular weight, $\overline{Mn}$, of the acrylic glycidyl group-containing copolymers was measured by gel permeation chromatography, the apparatus being calibrated by means of homodisperse polystyrene standards (i.e. where $\overline{Mw}/\overline{Mn}=1$); the number-average molecular weight of the linear carboxyl group-containing polyesters was determined from the equation.

$$\overline{Mn} = \frac{functionality \times 56,100}{AN}$$

where AN is the acid number, expressed in mg KOH/g of polyester;

The viscosity was measured at 200° C. in a cone/plate viscometer, known as "ICI viscosity", according to ASTM D 4287-88; it is expressed in mPa.s.

Unless stated otherwise, the parts mentioned in the examples are parts by weight.

EXAMPLE 1

Synthesis of linear carboxyl group-containing polyesters

The synthesis of these polyesters was carried out in two steps; a hydroxyl group-containing polyester was prepared in the first step, and in the second step the hydroxyl group-containing polyester was esterified with an organic dicarboxylic acid.

1st step 1,406.15 parts of neopentyl glycol were introduced into a cylindrical double-walled reactor equipped with a stirrer, a nitrogen inlet and outlet, a thermocouple, an adiabatic column, a condenser, a water separator and a vacuum connection tube. The reactor was heated at 130° C. until the product melted, and 2,076.83 parts of terephthalic acid and 8.71 parts of n-butyltin trioctanoate, as the esterification catalyst, were then added.

The temperature of the reaction mixture was subsequently gradually increased to 225° C. When the reaction mixture became clear (which generally corresponds to an esterification level of about 95%), a vacuum of 50 mm Hg was established gradually and the reaction was continued under reduced pressure until a hydroxyl group-containing polyester having a hydroxyl number of 37 mg KOH/g was obtained.

2nd step

The hydroxyl group-containing polyester obtained in the first step was cooled to 200° C., and 230.19 parts of adipic acid were added. When a homogeneous mixture was obtained, the temperature was brought to 225° C., and this temperature was maintained for about 2 hours, until the reaction mixture became clear. The reaction was completed in vacuo, until a carboxyl group-containing polyester having an acid number of 24 mg KOH/g was obtained. The average molecular weight $\overline{Mn}$ of the linear carboxyl group-containing polyester obtained was 5,610 and its functionality was 2. This polyester is numbered 1a below.

Polyesters 1b and 1c for use in the compositions according to the invention, and also polyesters 1d and 1e, which are used for comparison, were prepared by the same procedure. Table I below shows, for each step in the syntheses of the polyesters, the nature and the amounts of the starting compounds, the hydroxyl number (OHN) of the hydroxyl group-containing polyester and also the acid number (AN), the average molecular weight $\overline{Mn}$ and the functionality of the carboxyl group-containing polyester finally obtained. The starting compounds are designated by the following abbreviations :

TPA: terephthalic acid.
IPA: isophthalic acid.
AdA: adipic acid.
NPG: neopentyl glycol.
TMP: trimethylolpropane.
HBPA: hydrogenated bisphenol A.

TABLE I

| Polyester | Step 1 (parts) | OHN (mg KOH/g) | Step 2 (parts) | AN (mg KOH/g) | $\overline{Mn}$ | Functionality |
|---|---|---|---|---|---|---|
| 1b | TPA(1438.9) AdA(75.73) NPG(1060.2) | 50 | IPA(295.89) | 35 | 3205 | 2 |
| 1c | TPA(873.05) AdA(45.95) NPG(684.23) | 80 | IPA(288.66) | 50 | 2244 | 2 |
| 1d | TPA(1780.96) NPG(1185.26) TMP(45.62) | 50 | AdA(244.65) | 20 | 8465 | 3(1) |
| 1e | TPA(647.76) NPG(430.34) HBPA(184.43) | 100 | IPA(204.84) AdA(92.03) | 70(1) | 1603 | 2 |

(1) by way of comparison

EXAMPLE 2.

Synthesis of glycidyl group-containing acrylic copolymers 480 parts of ethyl acetate were introduced into a double-walled cylindrical reactor having a capacity of 2 liters and equipped with an anchor stirrer, a condenser, a nitrogen inlet and outlet and a metering pump feed system from a charging box, and heated to the reflux temperature under a nitrogen atmosphere. A homogeneous mixture composed of 400 parts of methyl methacrylate, 100 parts of glycidyl methacrylate, 5 parts azo-bis-isobutyronitrile and 15 parts of n-dodecylmercaptan was then introduced for about 4 hours, while stirring. After all of this mixture was added, the reaction mixture was maintained at 80° C. for a further 2 hours, while stirring, the major portion of the solvent was then distilled off and the contents of the reactor were emptied into an aluminum container. The latter was maintained at 60° C. under a reduced pressure of less than 50 mm Hg for 16 hours to remove the reminder of the solvent. The glycidyl group-containing acrylic copolymer obtained was in the form of a solid product, which was easily ground to give a whitish powder.

The resulting acrylic copolymer had the following characteristics:

Tg: 55°–60° C. (determined by differential scanning calorimetry or DSC);

Viscosity: 15,400 mPa.s; $\overline{Mn}$: 6,050. This copolymer is numbered 2a below.

A series of other glycidyl group-containing acrylic copolymers was prepared by following the same procedure but varying the nature and proportions of monomers and the amount of chain transfer agent used, in order to obtain copolymers of different molecular weights. The compositions of these different copolymers, numbered 2b to 2p are described in examples 4 to 6 below, as are their characteristics (viscosity and average molecular weight $\overline{Mn}$).

EXAMPLE 3.

Preparation of powdered thermosetting compositions.

These compositions were prepared by mixing a binder composed of a carboxyl group-containing polyester, prepared as described in Example 1, and a glycidyl-group containing acrylic copolymer, prepared as described in Example 2, with various auxiliary substances conventionally used for the preparation of powdered paints and varnishes. The mixture obtained was homogenized at a temperature of about 105° C. in an extruder (of the twin-screw APV type: MP 20/30 from Baker-Perkins) and the extrudate was crushed and ground in a "toothed disc" type mill (from Alpine) and then sieved to form a powder, the particle size of which is between 40 and 60 micrometers.

A typical composition is the following:

Polyester 1b : 420 parts
Copolymer 2a : 180 parts
Titanium dioxide (1) : 400 parts
Flow control agent (2) : 7 parts
Benzoin : 3 parts (1) KRONOS® CL310 (Ciba-Geigy)
(2) RESIFLOW® PV5 (Worlee Chemie).

In this composition, numbered 3.1 below, the weight ratio of polyester/acrylic copolymer was 70/30.

The properties of the coatings obtained with these compositions were tested by applying the powder with an electrostatic spray gun onto degreased steel panels at a voltage of 50 kV. The thickness of the coating thus formed was 60 to 80 micrometers.

The compositions deposited were then cured for 15 minutes at 200° C., and the coatings obtained after curing were subjected to the tests described above.

EXAMPLE 4.

Influence of the average molecular weight of the glycidyl group-containing acrylic copolymer on the properties of the coatings obtained.

The importance of the average molecular weight of the glycidyl group-containing acrylic copolymer for obtaining matte coatings is shown in this example. A series of acrylic copolymers was first prepared by the method of Example 2, but with increasing amounts of chain transfer agent, in order to obtain copolymers of different molecular weights. Powdered thermosetting compositions were then prepared as described in Example 3, using polyester 1b described in Example 1 and acrylic copolymers having different molecular weights $\overline{Mn}$. These different compositions and the properties of the coatings obtained are described in Table II, in which:

line 1 gives the number of the acrylic copolymer used in the composition, line 2 gives the % by weight of chain transfer agent (n-dodecylmercaptan) with respect to the total weight of monomers used in the synthesis of the acrylic copolymer, line 3 gives the viscosity in mPa.s of the acrylic copolymer, line 4 gives the average molecular weight Fin of the acrylic copolymer, line 5 gives the number of the composition containing the acrylic copolymer and polyester 1b in the weight ratio stated in Example 3, lines 6, 7 and 8 give, respectively, the gloss, the adhesion and the appearance of coatings obtained from the composition under the conditions described in Example 3.

TABLE II

Properties of the coatings in function of the $\overline{Mn}$ of the copolymer.

| (1) Copolymer n°. | 2b | 2c | 2d | 2a | 2e | 2f |
|---|---|---|---|---|---|---|
| (2) Transfer agent (%) | 1 | 2 | 2.5 | 3 | 3.5 | 6 |
| (3) Viscosity (mPa · s) | 49,000 | 26,500 | 20,100 | 15,400 | 9,900 | 3,200 |
| (4) $\overline{Mn}$ | 11,030 | 7,920 | 6,970 | 6,050 | 4,920 | 2,640 |
| (5) Composition n°. | 3.2(1) | 3.3 | 3.4 | 3.1 | 3.5 | 3.6(1) |
| (6) Gloss | 5 | 7 | 8.5 | 7 | 8 | 83 |
| (7) Adhesion | 0 | 10 | 10 | 10 | 10 | 10 |
| (8) Appearance | P | G | G | G | G | G |

(1) by way of comparison

It can be seen that only compositions 3.3, 3.4, 3.1 and 3.5 give coatings which have the required combination of desired properties, that is to say a matte and regular appearance and good mechanical properties (adhesion).

In fact, composition 3.6 (comparison), which contains acrylic copolymer 2f of molecular weight $\overline{Mn}$ 2,640 (less than 4,000), gives coatings having good adhesion and appearance, properties but which are very glossy (gloss of 83).

In addition, comparative 3.2 which contains acrylic copolymer 2b of molecular weight M̄n 11,030, (greater than 10,000), gives a matte coating (gloss of 5), but the quality (adhesion and appearance) is clearly insufficient to render it usable in practice.

EXAMPLE 5.

Influence of the monomer composition forming the acrylic copolymer on the properties of the coatings obtained.

For this test, a series of acrylic copolymers was prepared using the method of Example 2, but varying the nature and amount of the monomers and the amount of chain transfer agent used. Thermosetting compositions were then prepared in the same manner as in Example 3, using polyester 1b and said series of acrylic copolymers, but maintaining an epoxy/carboxyl equivalents ratio equal to 1. In practice, for a copolymer containing 10% by weight of glycidyl methacrylate, 55 parts of polyester were used per 45 parts of acrylic copolymer; for a copolymer containing 20% by weight of glycidyl methacrylate, the weight ratio of polyester/acrylic copolymer was 70/30; for a copolymer containing 25% of glycidyl methacrylate, this weight ratio was 77/23, and for a copolymer containing 40% of glycidyl methacrylate, this weight ratio was 83/17.

These various compositions and the properties obtained are described in Table III, in which:

line 1 gives the number of the acrylic copolymer used in the composition, lines 2, 3, 4 and 5 give the detailed composition of the acrylic copolymer, line 6 gives the % by weight of chain transfer agent (n-dodecylmercaptan) with respect to the total weight of monomers used in the synthesis of the acrylic copolymer, line 7 gives the viscosity in mPa.s of the acrylic copolymer, line 8 gives the average molecular weight $\bar{M}n$ of the acrylic copolymer, line 9 gives the number of the composition containing the copolymer and polyester 1b, lines 10, 11 and 12 give, respectively, the gloss, the adhesion and the appearance of coatings obtained from the compositions under the conditions described in Example 3.

In this table, the data from Example 4 relating to copolymers 2c, 2a and 2e and the corresponding compositions 3.3, 3.1 and 3.5 are also summarized for comparison. The four compounds used for the preparation of the acrylic copolymers are designated by the following abbreviations:

MMA: methyl methacrylate

GMA: glycidyl methacrylate

BuA: n-butyl acrylate

STY: styrene

TABLE III

Properties of the coatings in function of the composition of the acrylic copolymer

| Copolymer n° | 2g | 2c | 2h | 2i | 2j | 2a | 2k |
|---|---|---|---|---|---|---|---|
| Composition of the copolymer | | | | | | | |
| MMA (%) | 90 | 80 | 75 | 60 | 60 | 80 | 40 |
| GMA (%) | 10 | 20 | 25 | 25 | 40 | 20 | 20 |
| BuA (%) | 0 | 0 | 0 | 15 | 0 | 0 | 10 |
| STY (%) | 0 | 0 | 0 | 0 | 0 | 0 | 30 |
| Transfer agent (%) | 2 | 2 | 2 | 2 | 2 | 3 | 3 |
| Viscosity (mPa·s) | 39,500 | 26,500 | 31,000 | 12,000 | 20,000 | 15,400 | 1,800 |
| M̄n | 8,210 | 7,920 | 8,190 | 8,050 | 8,000 | 6,050 | 5,987 |
| Composition n° | 3.7 | 3.3 | 3.8 | 3.9 | 3.10(1) | 3.1 | 3.11(1) |
| Gloss | 9 | 7 | 12 | 10 | 41 | 7 | 64 |
| Adhesion | 10 | 10 | 10 | 10 | 10 | 10 | 10 |
| Appearance | G | G | G | G | G | G | G |

| Copolymer n° | 2l | 2m | 2n | 2e | 2o | 2p |
|---|---|---|---|---|---|---|
| Composition of the copolymer | | | | | | |
| MMA (%) | 100 | 90 | 72 | 80 | 75 | 60 |
| GMA (%) | 0 | 10 | 10 | 20 | 25 | 40 |
| BuA (%) | 0 | 0 | 18 | 0 | 0 | 0 |
| STY (%) | 0 | 0 | 0 | 0 | 0 | 0 |
| Transfer agent (%) | 3 | 3.5 | 3.5 | 3.5 | 3.5 | 3.5 |
| Viscosity (mPa·s) | 22,000 | 16,000 | 8,100 | 9,900 | 10,200 | 8,900 |
| M̄n | 6,120 | 4,760 | 5,210 | 4,920 | 5,130 | 5,180 |
| Composition n° | 3.12(1) | 3.13 | 3.14 | 3.5 | 3.15 | 3.16(1) |
| Gloss | 69 | 12 | 10 | 8 | 11 | 72 |
| Adhesion | 2 | 10 | 10 | 10 | 10 | 10 |
| Appearance | P | G | G | G | G | G |

(1) by way of comparison

The results in Table III show that the acrylic copolymer must contain a certain amount of glycidyl methacrylate to allow cross-linking of the coating. In fact, comparative composition 3.12, which includes the acrylic polymer 2l containing no glycidyl methacrylate (0%), gives a coating having properties which are clearly less good (adhesion: 2) and an irregular appearance. In addition, it can be seen that when the amount of glycidyl methacrylate in the acrylic copolymer is too high, it is no longer possible to obtain matte coatings. Thus, for example, comparative composition 3.10 including polymer 2j, which contains 40% by weight of glycidyl methacrylate, provides a glossy coating (gloss of 41) and comparative composition 3.16 containing copolymer 2p of the same composition, but with a lower molecular weight, also provides a glossy coating. This demonstrates that, in order to obtain a matte coating the use of an acrylic copolymer containing more than 30% by weight of glycidyl methacrylate, with respect to the total weight of monomers, is not advisable In addition, it can be seen that the acrylic copolymer should contain a preponderant amount of methyl methacrylate besides glycidyl methacrylate. In fact, if the results obtained with composition 3.9 (copolymer 2i) and composition 3.14 (copolymer 2n) are compared, with, respectively, composition 3.8 (copolymer 2h) and composition 3.13 (copolymer 2m), it can be seen that methyl methacrylate can be replaced by a small amount of another vinyl monomer (e.g. butyl acrylate) and a matte coating can still be obtained. However, it is advisable to replace no more than 25% by weight of the methyl methacrylate by (an)other vinyl monomer(s). In fact, at higher substitution levels (composition 3.11), a coating which is clearly unacceptably glossy is obtained (gloss of 64).

Finally, it can be seen that compositions 3.1, 3.3, 3.5, 3.7 to 3.9 and 3.13 to 3.15 according to the invention, which contain acrylic copolymers with the desired amount of glycidyl methacrylate and methyl methacrylate, give matte coatings on curing, the gloss of which is less than or equal to 12 and which have an excellent adhesion and a very good appearance.

EXAMPLE 6.

Influence of the nature of the carboxyl group-containing polyester on the properties of the coatings obtained.

The aim of this example is to demonstrate the influence of the nature of the carboxyl group-containing polyester on the properties of the coatings obtained. To this effect, powdered thermosetting compositions were prepared by the method of Example 3 from polyesters 1a to 1e described in Example 1 and acrylic copolymer 2a described in Example 2. The ratio of epoxy/carboxyl equivalents in these thermosetting compositions is always kept equal to 1. For this reason, polyesters 1a and 1d (AN=20) and acrylic copolymer 2a were used in a weight ratio of 80/20, polyester 1b (AN=35) and copolymer 2a were used in a weight ratio of 70/30, polyester 1c (AN=50) and copolymer 2a were used in a weight ratio of 60/40 and polyester 1e (AN=70) and copolymer 2a were used in a weight ratio of 53/47. The results obtained with the thermosetting compositions are reported in Table IV, in which line 1 gives the number of the polyester used in the composition, line 2 gives the acid number (AN) thereof, line 3 gives its functionality, line 4 gives the number of the composition containing acrylic copolymer 2a and the polyester in the proportions indicated above, lines 5, 6 and 7 give, respectively, the gloss, the adhesion and the appearance of coatings obtained from compositions prepared as described in Example 3.

TABLE IV

| Properties of the coatings in function of the nature of the polyester | | | | | | |
|---|---|---|---|---|---|---|
| Polyester n° | 1a | 1a | 1b | 1c | 1d | 1e |
| AN | 24 | 24 | 35 | 50 | 20 | 70 |
| Functionality | 2 | 2 | 2 | 2 | 3 | 2 |
| Composition n° | 3.17 | 3.18(2) | 3.1 | 3.19 | 3.20(1) | 3.21(1) |
| Gloss | 7 | 11 | 7 | 9 | 74 | 39 |
| Adhesion | 10 | 10 | 10 | 10 | 10 | 10 |
| Appearance | G | G | G | G | G | G |

(1) by way of comparison
(2) plus 0.2 part of ethyltriphenylphosphonium bromide (ETPB) as a cross-linking catalyst.

As the result obtained with comparative composition 3.20 shows, a matte coating is not obtained (gloss of 74) with a branched-chain polyester of functionality equal to 3. It can also be seen that it is not possible to obtain a matte coating (gloss of 39) with a polyester of acid number 70 mg KOH/g (comparative composition 3.21). Composition 3.18, which is similar to composition 3.17 in all respects except that it contains 0.2% by weight of a cross-linking catalyst, allows a matte coating to be obtained (gloss of 11).

In conclusion, it can be seen that to obtain matte coatings of excellent quality, it is absolutely essential that the polyester used is linear and that it has an acid number of 20 to 50 mg KOH/g. It should also be noted that the presence of a small amount of a cross-linking catalyst in these compositions is acceptable.

EXAMPLE 7.

Weatherability of the matte coatings obtained from the powdered thermosetting compositions.

In this example, the outstanding weatherability of the matte coatings according to the invention is demonstrated. To this effect, the following powdered thermosetting compositions were used:

a) the compositions prepared in Example 5 from polyester 1b and acrylic copolymers 2g, 2c, 2i, 2j, 2a and 2n, the composition of which is given in Table III in that example. These compositions were prepared using the method of Example 3 but maintaining a ratio of epoxy/carboxyl equivalents equal to 1; they gave white-coloured coatings on curing;

b) the compositions indicated in a) above, but in which the 400 parts of titanium dioxide have been replaced by 400 parts of the following mixture:

Blanc fixe N : 200 parts
Titanium dioxide KRONOS® CL310 : 40 parts
Black iron oxide (Bayer) : 160 parts These compositions gave grey-coloured coatings on curing.

The properties of the coatings obtained with these compositions were tested by applying the powder with an electrostatic spray gun onto aluminum panels under a voltage of 50 kV. The thickness of the coating thus formed was 60 to 80 micrometers. The coatings obtained after curing for 15 minutes at 200° C. were subjected to an accelerated ageing test (Q-U-V® test described above) in order to evaluate the resistance to UV rays. Their gloss, their adhesion to metal and their appearance before and after 1,000 hours of exposure were determined. Also the change in tint delta E of the coatings between the beginning and the end of the experiment was determined.

The results thus obtained are reproduced in Table V, in which:

line 1 gives the number of the acrylic copolymer used in the composition, line 2 gives the number of the composition containing the acrylic copolymer and polyester 1b, and which provides the white coatings, lines 3, 5 and 7 give, respectively, the gloss, the adhesion and the appearance of the white coatings, determined in each case at the beginning (0 hour) and at the end (1,000 hours) of the experiment, line 9 gives the change in tint delta E of the white coatings between the beginning and the end of the experiment, line 10 gives the number of the composition containing the acrylic copolymer and polyester 1b and which provides the grey coatings, lines 11, 13 and 15 give, respectively, the gloss, the adhesion and the appearance of the grey coatings, determined in each case at the beginning (0 hour) and at the end (1,000 hours) of the experiment, line 17 gives the change in tint delta E of these grey coatings.

TABLE V

Accelerated ageing of the coatings

| Copolymer n° | | 2g | 2c | 2i | 2j | 2a | 2n |
|---|---|---|---|---|---|---|---|
| Composition n° | | 3.7 | 3.3 | 3.9 | 3.10(1) | 3.1 | 3.14 |
| Gloss | - 0 h | 9 | 7 | 10 | 41 | 7 | 10 |
|  | - 1000 h | 8 | 8 | 9 | 31 | 7 | 10 |
| Adhesion | - 0 h | 10 | 10 | 10 | 10 | 10 | 10 |
|  | - 1000 h | 10 | 10 | 10 | 10 | 10 | 10 |
| Appearance | - 0 h | G | G | G | G | G | G |
|  | - 1000 h | G | G | G | G | G | G |
| Delta E |  | 0.2 | 0.3 | 0.2 | 0.5 | 0.4 | 0.4 |
| Copolymer n° | | 2g | 2c | 2i | 2j | 2a | 2n |
| Composition n° | | 3.22 | 3.23 | 3.24 | 3.25(1) | 3.26 | 3.27 |
| Gloss | - 0 h | 10 | 8 | 10 | 42 | 8 | 9 |
|  | - 1000 h | 10 | 7 | 9 | 35 | 9 | 9 |
| Adhesion | - 0 h | 10 | 10 | 10 | 10 | 10 | 10 |
|  | - 1000 h | 10 | 10 | 10 | 10 | 10 | 10 |
| Appearance | - 0 h | G | G | G | G | G | G |
|  | - 1000 h | G | G | G | G | G | G |
| Delta E |  | 0.3 | 0.4 | 0.5 | 0.4 | 0.2 | 0.3 |

(1) by way of comparison

As the results of Table V show, the matte coatings obtained according to the invention have a remarkable weatherability. Their adhesion, their appearance and their gloss vary hardly at all after 1,000 hours of accelerated ageing; the change in tint delta E is negligible (delta E less than or equal to 0.5), whether white or grey.

What is claimed is:

1. A process for the preparation of a matte coating on an article, which comprises applying to said article a powdered thermosetting composition comprising as binder a mixture of (a) a linear carboxyl group-containing polyester having an acid number of 20 to 50 mg KOH/g, said carboxyl group-containing polyester being the esterification product of a hydroxyl group-containing polyester with an organic dicarboxylic acid; and (b) a glycidyl group-containing acrylic copolymer obtained from 5% to 30% by weight of glycidyl acrylate or glycidyl methacrylate and from 70% to 95% by weight of methyl methacrylate, wherein up to 25% of the total weight of methyl methacrylate can be replaced by another vinyl monomer, said acrylic copolymer having a number-average molecular weight ($\overline{Mn}$) of about 4,000 to about 10,000, and curing the thus coated article at a temperature of from 160° C. to 210° C. for a period of up to about 30 minutes.

2. The process of claim 1, wherein the linear carboxyl group-containing polyester has a functionality of two and a number-average molecular weight of 2,000 to 6,000.

3. The process of claim 1, wherein the acid constituent of the linear carboxyl group-containing polyester is an organic dicarboxylic acid selected from the group consisting of terephthalic acid, isophthalic acid, phthalic acid, adipic acid, succinic acid, 1,4-cyclohexanedicarboxylic acid and mixtures thereof.

4. The process of claim 1, wherein the alcoholic constituent of the linear carboxylic group-containing polyester is an organic dihydroxy compound selected from the group consisting of neopentyl glycol, ethylene glycol, diethylene glycol, 1,4-butanediol, 1,6-hexanediol, neopentyl glycol hydroxypivalate, 1,4-cyclohexanedimethanol, 2,2-bis(4-hydroxycyclohexyl)propane and mixtures thereof.

5. The process of claim 1, wherein the vinyl monomer which can replace methyl methacrylate in the glycidyl group-containing acrylic copolymer is selected from the group consisting of butyl acrylate, methyl acrylate, ethyl acrylate, 2-ethylhexyl acrylate, ethyl methacrylate, butyl methacrylate, styrene and mixtures thereof.

6. The process of claim 1, wherein the glycidyl group-containing acrylic copolymer has a number-average molecular weight within the range of from more than 5,000 to 9,000.

7. The process of claim 1, wherein the ratio of the amount of linear carboxyl group-containing polyester to the amount of glycidyl group-containing acrylic copolymer is such that there are 0.5 to 1.5 equivalents of carboxyl groups per equivalent of epoxy groups in the acrylic copolymer.

8. The process of claim 1, wherein the ratio of the amount of linear carboxyl group-containing polyester to the amount of glycidyl group-containing acrylic copolymer is such that there are 0.8 to 1.2 equivalents of carboxyl groups per equivalent of epoxy groups in the acrylic copolymer.

9. An article coated entirely or partly by the process according to claim 1.

* * * * *